United States Patent [19]

Sandford, Jr.

[11] 4,123,604

[45] Oct. 31, 1978

[54] PROCESS FOR COATING A SUBSTRATE AND AN IMPROVED COATING THEREFORE

[75] Inventor: Robert W. Sandford, Jr., Midland, Mich.

[73] Assignee: Dow Corning Corporation, Midland, Mich.

[21] Appl. No.: 839,876

[22] Filed: Oct. 6, 1977

Related U.S. Application Data

[62] Division of Ser. No. 605,491, Aug. 18, 1975.

[51] Int. Cl.$^2$ .................................... C08G 77/04
[52] U.S. Cl. .................................... 528/31; 260/825; 428/447; 428/450; 428/452; 528/15; 528/32; 528/33
[58] Field of Search ............ 260/46.5 UA, 46.5 G, 260/46.5 H, 825; 428/447, 450, 452

[56] References Cited

U.S. PATENT DOCUMENTS

| | | | |
|---|---|---|---|
| 3,527,659 | 9/1970 | Keil | 260/46.5 UA |
| 3,697,473 | 10/1972 | Polmanteer | 260/46.5 UA |
| 3,928,629 | 12/1975 | Chandra | 260/46.5 UA |
| 3,960,810 | 6/1976 | Chandra et al. | 260/46.5 UA |
| 4,026,835 | 5/1977 | Lee et al. | 260/46.5 UA |

*Primary Examiner*—Melvyn I. Marquis
*Attorney, Agent, or Firm*—Robert L. McKellar

[57] ABSTRACT

This application discloses a novel and improved coating composition and an improved process for coating substrates. The compositions are essentially solventless and when cured give highly abrasion resistant coatings, non-blocking characteristics, fast cure and a general overall aesthetic appearance. An example of coating a substrate is the coating of paper products to give release from adhesives.

4 Claims, No Drawings

PROCESS FOR COATING A SUBSTRATE AND AN IMPROVED COATING THEREFORE

This is a division, of application Serial No. 605,491, filed Aug. 18, 1975.

There has been a desire for a long time to be able to separate aggressively sticky materials from various substrates. Such substrates are glass, stone, plastic, rubber, metal, wood and paper. Such aggressively sticky materials are adhesives, tar, pitch, raw rubber, pressure sensitive adhesives and asphalt.

Preferred substrates, for which the compositions of this invention are useful, are cellulosic sheets, e.g., corrugated paper, kraft paper, calendared kraft paper, glassine, parchment, cellulose acetate sheets, wrapping paper, cotton fabric and metals, preferably aluminum foil.

The most preferred substrates, however, are paper and aluminum foil. The reason for this is that the compositions of this invention lend themselves well to the coating of such materials which in turn leads to very desirable commercial applications.

Many prior art materials have been advocated for the coating of papers, especially siloxanes.

One such system can be found in German Offenlegungschrift No. 2,210,380 and consists of a process for coating a surface by applying thereto a fluid composition which is (1) a polydiorganosiloxane which contains vinyl radicals and (2) an organopolysiloxane having silicon-bonded hydrogen atoms. The mixture is cured using platinum and platinum complexes as catalysts. The platinum catalyzed system is touted as being a more rapid curing material. The disadvantage to such a system, however, is that the compositions containing the platinum have a very limited bath life after all the components are mixed. Another disadvantage is the limited abrasion resistance or rub-off as it is known in the paper coating art.

Another such system is that disclosed in U.S. Pat. No. 3,527,659 in which there is disclosed the use of a resinous copolymer to give intermediate release values to a cured composition when it was coated on paper. The resinous copolymer obviously balanced its tackiness against the release characteristics of the linear siloxanes to give the intermediate release values, i.e., the more resinous copolymer that is added to the linear siloxane, the higher the tackiness of the cured coating and the higher the release values. That patent also incidentally discloses the use of platinum to cure the system using a vinyl-containing siloxane and a siloxane-containing silicon-bonded hydrogen.

Carrying the disclosure in that U.S. patent to its logical end, one can easily speculate that correspondingly larger amounts of the resinous copolymer in the base siloxane would eventually lead to an adhesive.

That patent suggests that the definition of "intermediate release" is 40 to 550 grams when tested on the Keil tester and the examples show values of 400, 550, 114, 160, 169, 183, etc. (See Examples 1 and 2.) Thus, the patent states an upper value of 45 parts by weight of the resinous copolymer to 100 parts of the base siloxane, supposedly for fear of running into a material having too great an adhesive value. Moreover, the definition of the resinous copolymer in U.S. Pat. No. 3,527,659 includes $R_3SiO_{1/2}$ wherein R is defined as having "no more than two carbon atoms", which includes vinyl. However, the patent does not specifically diclose the use of a "vinylated" resinous copolymer per se in conjunction with the system wherein silicon-bonded hydrogen atoms are added to silicon-bonded alkenyl groups. The only combination of a vinyl containing base polymer (a) and a vinyl containing resin (b) is in Example 3 and there the system is cured by an entirely different mechanism, namely, the hydrolysis and condensation of ketoxime groups. Thus, there is no direction given to those skilled in the art towards the combination of this invention much less to the advantages of the instant combination over the obviously preferred combination of the patent in which (a) is a hydroxyl ended vinyl free polymer and (b) is a vinyl free resin and the cure involves the reaction of an SiOH with an SiH in the presence of a tin catalyst.

Furthermore, it would be entirely unexpected that compositions could be prepared which would contain large quantities of vinylated resinous copolymer, which would not only cure, but cure much faster than the platinum catalyzed $\equiv$SiH addition to $CH_2$=$CHSi\equiv$ and which would give intermediate release values when cured on a substrate.

Finally, mention should be made of the pending U.S. application Ser. No. 479,245 filed June 14, 1974, now U.S. Pat. No. 3,928,629 in the name of Grish Chandra and Colin Rowland and assigned to Dow Corning Limited, wherein the curing of silicone coatings is described wherein silicon-bonded vinyl radicals are reacted with silicon-bonded hydrogen radicals in the presence of rhodium catalysts. No mention is made of the use of a vinyl containing resin nor the advantages to be gained by using such a material in that application.

Thus, it is an object of this invention to coat substrates with an improved coating composition which will give intermediate release values.

It is a further object of this invention to enhance the abrasion resistance of such coatings when cured.

It is still another object of this invention to provide for a solventless coating composition having improved physical properties.

It is yet another object to provide coating compositions that can be blended with solvents or can be blended with other siloxanes containing solvents to mutually impart enhanced properties to the cured coating.

It is additionally another object of this invention to provide for a composition that, when cured, gives non-blocking characteristics and which has a very pleasing aesthetic appearance, that is, the coatings are smooth, clear, glossy, colorless, are uniform in thickness and do not contain air bubbles or voids.

It is even another object of this invention to provide a fast curing composition.

It is moreover another object of this invention to provide a coating composition which has a prolonged bath life while in use.

It is a final object of this invention to provide an improved process for coating substrates.

According to the invention then there is provided a process for coating a substrate to obtain release which comprises applying thereto a composition comprising (1) 100 parts by weight of a diorganopolysiloxane-based formulation which is heat curable to an elastomer by the addition of silicon-bonded hydrogen atoms to silicon-bonded alkenyl groups, (2) from 0.5 to 90 parts by weight of a toluene soluble copolymer of (a) $R_3SiO_{1/2}$ units, (b) $(CH_2$=$CH)R_2SiO_{1/2}$ units and (c) $SiO_{4/2}$ units, the ratio of said (a) and (b) units to (c) units being from 0.6:1 to 1.1:1 and the silicon-bonded hydroxy content of (2) being no more than 0.7 weight percent based on the weight of (2), where R is a monovalent hydrocarbon radical of no more than 2 carbon atoms and (3) a catalyst comprising complexes of rhodium, selected from the group consisting of (i) $RhX_3(SR_2)_3$ and (ii) $Rh_2(CO)_4X_2$, wherein each X represents a halogen atom and each R represents an alkyl, aryl, aralkyl or alkaryl radical having from 1 to 8 inclusive carbon atoms or the $R'_3SiQ$ group in which Q represents a divalent aliphatic hydrocarbon radical having from 1 to 6 inclusive carbon atoms and R' represents an alkyl, aryl, aralkyl or alkaryl radical having from 1 to 8 inclusive carbon atoms or a $(CH_3)_3Si-$ group, not more than one R' per molecule being $(CH_3)_3Si-$, the entire composition being essentially free of solvents.

There is also provided a composition comprising (1) 100 parts by weight of a diorganopolysiloxane-based formulation which is heat curable to an elastomer by the addition of silicon-bonded hydrogen atoms to silicon-bonded alkenyl groups, (2) from 0.5 to 90 parts by weight of a toluene soluble copolymer of (a) $R_3SiO_{1/2}$ units, (b) $(CH_2=CH)R_2SiO_{1/2}$ units and (c) $SiO_{4/2}$ units, the ratio of said (a) and (b) units to (c) units being from 0.6:1 to 1.1:1 and the silicon-bonded hydroxy content of (2) being no more than 0.7 weight percent, based on the weight of (2), where R is a monovalent hydrocarbon radical of no more than 2 carbon atoms and (3) a catalyst comprising complexes of rhodium selected from the group consisting of (i) $RhX_3(SR_2)_3$ and (ii) $Rh_2(CO)_4X_2$, wherein each X represents a halogen atom and each R represents an alkyl, aryl, aralkyl or alkaryl radical having from 1 to 8 inclusive carbon atoms or the $R'_3SiQ$-group in which Q represents a divalent aliphatic hydrocarbon radical having from 1 to 6 inclusive carbon atoms and R' represents an alkyl, aryl, aralkyl or alkaryl radical having from 1 to 8 inclusive carbon atoms or a $(CH_3)_3Si-$ group, not more than one R' per molecule being $(CH_3)_3Si-$, the entire composition being essentially free of solvents.

By diorganopolysiloxane-based, we mean that the siloxane (1) is essentially linear, has an average of about 1.95 to 2.05 organic radicals attached to each silicon atom and the organic radicals are predominantly methyl radicals. The remaining substituents on silicon are vinyl radicals and there is preferably present at least two vinyl radicals per molecule of siloxane. Included within the scope of the diorganopolysiloxane (1) are the units $(CH_3)_2SiO_{1/2}$, $CH_3(CH_2=CH)SiO_{1/2}$, $(CH_3)_2(CH_2=CH)SiO_{1/2}$ and $(CH_3)_3SiO_{1/2}$. The viscosity of the siloxane (1) is not narrowly critical and should be at least 50 cs. at 25° C. The siloxane (1) is preferably terminated by the unit $(CH_3)_2(CH_2=CH)SiO_{1/2}$ on both ends but it should be understood that some small amounts, i.e., less than 0.5 weight percent of hydroxyl (based on the weight of the siloxane (1)) can be tolerated. It is within the scope of this invention to include siloxanes (1) which are terminated by the $(CH_3)_3SiO_{1/2}$ unit. It is also within the scope of this invention to have mixtures of siloxanes which have both the $(CH_3)_3SiO_{1/2}$ and $(CH_3)_2(CH_2=CH)SiO_{1/2}$ terminating groups. It is also within the scope of this invention to include small amounts of vinyl-containing cyclic siloxanes such as, for example, vinylmethyl cyclic trimer or tetramer. These materials tend to be low viscosity materials and their presence helps reduce the viscosity of the final composition. This is more significant in the instant invention since the final composition is essentially solventless.

It should be noted at this point that the diorganopolysiloxane (1) is curable by adding thereto a methylhydrogenpolysiloxane and the catalyst, component 3, described below. The methylhydrogenpolysiloxanes are known materials and their preparation will not be elaborated on herein. For more extensive information regarding these materials, reference should be made to U.S. Pat. No. 3,697,473, particularly column 4, which describes such materials. The linear methylhydrogenpolysiloxane, the cyclic methylhydrogenpolysiloxanes and their mixtures are contemplated as within the scope of this invention. The preferred substituents on silicon, besides the hydrogen, are methyl groups.

The second major portion of the inventive composition is the resinous copolymer (2). This resinous copolymer contains the units (a) $R_3SiO_{1/2}$, (b) $(CH_2=CH)R_2SiO_{1/2}$ and (c) $SiO_{4/2}$. The ratio of said (a) and (b) units to said (c) units is 0.6:1 to 1.1:1. The material is a toluene soluble copolymer which has been treated to reduce its hydroxyl content. Further, it is preferred that there be present at least two vinyl groups per molecule of the resinous copolymer. The preparation of the resinous copolymer has been described in detail in U.S. Pat. No. 2,676,182. When so prepared, the resinous copolymer has a hydroxyl content of 2 to 3 weight percent and for this invention, the hydroxyl content has to be reduced. Thus, the resinous copolymer can be reacted with a silanol reactive, triorganosilylated capping agent which is non-reactive with the siloxane linkages. One such agent is a silazane of the formula $(R_3Si)_2NH$ or a silylamine, such as, $R_3SiNH_2$ where R can be methyl or vinyl, i.e., hexamethyldisilazane or dimethylvinylsilylamine.

It is preferred that the silicon-bonded hydroxy content of ingredient (2) be no more than 0.3 weight percent. Values greater than 0.3 weight percent have a tendency to interfere with the release characteristics of the final composition.

As was mentioned earlier, the resinous copolymer, for purposes of this invention, should contain at least two vinyl groups per molecule of the resinous copolymer. As was also discussed above, one way to include the vinyl in the resinous copolymer is to treat the resinous copolymer with a silazane or some equivalent capping agent which contained dimethylvinyl group. Another way to incorporate the dimethylvinyl is as the silane when the resinous copolymer is first prepared, that is, cohydrolyzing $Me_2(CH_2=CH)SiCl$ with the other silanes as shown in U.S. Pat. No. 2,676,182. When this method is employed, then generally the hydroxyl of the resinous copolymer is reduced by the use of triorganosilyl capping agents other than dimethylvinyl containing capping agents.

The third important ingredient of this invention is the catalyst. The catalysts of this invention are complexes of rhodium selected from the group consisting of (i) $RhX_3(SR_2)_3$ and (ii) $Rh_2(CO)_4X_2$ wherein each X represents a halogen atom and each R represents an alkyl, aryl, aralkyl or alkaryl radical having from 1 to 8 inclusive carbon atoms or the $R'_3SiQ-$ group in which Q represents a divalent aliphatic hydrocarbon radical having from 1 to 6 inclusive carbon atoms and R' represents an alkyl, aryl, aralkyl or alkaryl radical having from 1 to 8 inclusive carbon atoms or a $(CH_3)_3Si-$ group, not more than one R' per molecule being $(CH_3)_3Si-$.

The composition of this invention is obtained by mixing the above ingredients 1, 2 and 3 in the proportions of 100 parts of diorganopolysiloxane base formulation, 0.5 to 90 parts by weight of the toluene soluble resinous copolymer and a catalytic quantity of the rhodium catalyst. Also included in the mixture is the methylhydrogenpolysiloxane curing agent described earlier. The amount of the methylhydrogenpolysiloxane curing agent used herein is dependent on the amount of components (1) and (2) that are used. Generally, the materials are used in such proportions that there is present enough silicon-bonded hydrogen to give at least 0.5 silicon-bonded hydrogen atoms for each silicon-bonded vinyl group and up to 1.0 silicon-bonded hydrogen atoms for each silicon-bonded vinyl groups.

It should be noted that the composition of the instant invention is solventless, that is, the amount of solvent that can be present in the final composition is less than 3 percent by weight based on the total composition.

The compositions of this invention are usually applied neat as they are solventless. This is in contrast to conventionally used coatings formulated from siloxanes wherein the coatings are applied as solvent solutions, either in organic solvents or as emulsions in water.

It is believed that there is a synergistic effect with the use of the vinylated resinous copolymer and the rhodium catalyst of this invention, is conjunction with the polydiorganosiloxane base material.

The rhodium catalysts of this invention have the advantage of being dispersable in the inventive composition. This allows one skilled in the art to take advantage of the fast cure associated with rhodium catalysts. It also allows one skilled in the art to take advantage of the ability of rhodium catalysts to remain stable in the application bathes and at the same time stabilize the bath itself against degradation.

This is in contrast to the platinum catalyzed system where fast cures are found but bath lifes are inadequate with the presence of the platinum catalyst. By way of example, when one compares the same siloxane systems, the cure of the instant inventive composition would take place in 15 to 30 seconds at 365° F. to 255° F. (184° C.–124° C.) and the bath would be stable enough to allow an 8 hour working shift to use the catalyzed bath. On the other hand, the same siloxane system which would require 1 minute to 3 minutes at approximately the same temperatures would degrade within ½ to 1 hour unless fortified with some kind of inhibitor system for the platinum. Once again, no advantage is gained by the use of inhibitors because usually when they are utilized, the system requires hotter temperatures or more time, or both, to effect a cure.

Thus, the instant invention has the advantage of very fast cures, i.e., 15 to 30 seconds versus 60 to 180 seconds, and prolonged bath life. The former advantage is significant because, as a practical matter, the coating consumers use tunnel ovens to effect cure and there would be a savings of many feet of required tunnel oven. Moreover, it is a savings in energy as the coating consumer does not have to operate extra lengths of curing ovens.

As mentioned before, because of the rhodium catalyst, these compositions can be used neat. That is not to say, however, that they cannot be blended with solvents as other siloxane systems containing solvents. Because of this advantage, the compositions of this invention are more versatile. It allows for minimal process emissions when the coatings are cured. One can also meet restrictions on process air emissions, eliminate solvent recovery or incineration and conserve on raw material handling and costs.

These compositions, when cured, have non-blocking characteristics, that is, there is no transfer of these coatings from one surface to another. In addition, these coatings have enhanced abrasion resistance over the conventional platinum cured materials, exhibiting no rub-off at all.

These compositons, when cured, have a very pleasing aesthetic appearance, that is, they cure clear and colorless, are uniform in thickness and do not contain air bubbles or voids.

As indicated earlier, it was believed that increasing the resinous copolymer portion of this composition would eventually lead to very aggressive adhesive materials. Prior art materials were, in fact, limited by quantity of resinous copolymers which could be used with the base polydiorganosiloxane. For example, in U.S. Pat. No. 3,527,659 the quantity of resinous copolymer was limited to 45 parts by weight based on 100 parts by weight of the polydiorganosiloxane base.

The release values found in that patent ranged from 280 to 550 grams. The release obtained with the instant invention ranges from 90 to 300 grams on the Scott tester which is even more intermediate than the so-called intermediate range of U.S. Pat. No. 3,527,659. With the synergistic effect of the vinylated resinous copolymer and the rhodium catalyst in conjunction with the polydiorganosiloxane base, the values never reach the higher levels, i.e., the range of 400 grams to 600 grams where paper products tend to tear and become useless.

It is believed, and the inventor does not wish to held to such a theory, that the rhodium causes the vinylated resinous copolymer to tie into the composition more effectively and more uniformly, thus imparting its properties to the polydiorganopolysiloxane base material, thereby mutually enhancing the properties of both while in combination.

The process of coating substrates is enhanced by the use of the compositions of this invention. The ingredients are mixed, coated on a substrate by any suitable means such as spraying, brushing, roller or by the use of a doctor blade. The substrate, with the inventive composition applied thereto, is subjected to a heat cure. This can be done either by warm air, ovens, infra-red heat or the like, as long as the temperature sufficient for cure can be reached and maintained.

The temperatures for curing the compositions of this invention are preferably 255° F. to 365° F. (124° C. to 184° C.). The preferred length of cure is 15 seconds to 30 seconds.

The following examples are illustrative only and should not be construed as limiting the invention which is properly delineated in the appended claims. Me has been used as the abbreviation for methyl, Vi for vinyl and IPA is isopropylalcohol.

EXAMPLE 1

This example shows the ability to obtain intermediate release values while obtaining fast cures and abrasion resistance.

COMPOSITION 1 — 53.97 parts of Composition 4, 44.15 parts of composition 5, 1.04 parts of a low molecular weight cyclic siloxane containing $MeViSiO$ units and having a viscosity of 1 to 2 cs. at 25° C., 0.84 parts of $RhCl_3.(n-Bu_2S)_3$ catalyst at 3.15 weight percent in toluene.

COMPOSITION 2 — 41.7 weight percent of a trimethylsiloxy endblocked methylhydrogen fluid having a viscosity of approximately 30 cps. at 25° C. and 58.3 weight percent of Composition 4.

COMPOSITION 3 — 98.12 parts of Composition 4, 1.04 parts of a low molecular weight cyclic siloxane containing MeViSiO units and having a viscosity of 1 to 2 cs. at 25° C., 0.84 parts of $RhCl_3 \cdot (n\text{-}Bu_2S)_3$ catalyst at 3.15 weight percent in toluene.

COMPOSITION 4 — A polydimethylsiloxane fluid containing 92.3 weight percent of $Me_2SiO$ units, 2.1 weight percent of MeViSiO units and 5.6 weight percent of $ViMe_2SiO$ units.

COMPOSITION 5 — A toluene soluble copolymer of 0.9 molar parts of trimethylsiloxane units and 1 molar part of $SiO_{4/2}$ units, having a silicon-bonded hydroxyl content of 2 to 3 weight percent which has been treated with 7.5 to 12.0 mole percent $Me_2ViSiO_{1/2}$, based on the weight of Composition 5, to lower its hydroxyl content to 0.13 weight percent.

Release agents were prepared from compositions shown above, by combining the compositions in an eight ounce glass bottle and shaking the contents for 15 to 20 minutes on an air driven rotary shaker. At this time, the compositions were homogeneously mixed. The solvent was evaporated and the mixtures used as follows.

Weyerhauser S2S 40 lb. Kraft paper stock was treated with each of the below listed experimental materials, A–F. This was accomplished by using a blade coater which had a blade pressure of 2521 $gm/cm^2$. The paper stock was inserted in the blade coater, the appropriate experimental material was poured onto the paper adjacent to the blade and the paper was passed under the blade in a smooth, moderately fast motion. The coating was then cured at 163° C. for 30 seconds. The silicone treated paper was then placed coated side up in a Bird Film applicator (manufactured by Bird and Sons, East Walpole, Massachusetts) and the following adhesives were applied:

1. National Starch and Chemical Corporations 36-6045 SRB adhesive;
2. National Starch and Chemical Corporations 36-6141;
3. Monsanto Chemical Companys GMS-362 acrylic;
4. Monsanto Chemical Companys RA-1753 acrylic multipolymer.

All of the above adhesives were solvent coated on the silicone treated paper using the Bird Film applicator to give a wet film of 0.008 cm. The drawdown bar was cleaned with solvent between each application. The adhesive-coated release paper was heated in an oven for 60 seconds at 70° C. It was then conditioned at room temperature for 60 seconds.

A 21.6 cm × 27.9 cm, sixty pound Matte litho label stock was placed on the dried adhesive. It was then subjected to a 1.8 kg. rubber roller, twice, to produce a laminate. The laminate was then conditioned for 20 hours at 70° C. and then allowed to equilibrate for four hours at room temperature. Three strips were cut from the paper which were 1 inch × 6 inch (2.5 cm. × 15.0 cm.).

The strip was then attached to the Scott Tac Tester (horizontal tac tester, Scott Machine Products, Painesville, Ohio). The Scott tester pulls the label stock at an angle of 180° C. to the plane of the laminate and the peel strength is measured by a strain gage. The rate of pull was 60960 cm/hour. An average of three pulls for each experimental sample was taken. The results are recorded in tabular form.

| Parts by Weight Material Used | RELEASE AGENT EXPERIMENTAL SAMPLES Samples | | | | | |
|---|---|---|---|---|---|---|
| | A | B | C | D | E | F |
| Composition 1 | 0 | 2.5 | 5.0 | 7.5 | 10 | 10* |
| Composition 2 | 1.0 | 1.1 | 1.2 | 1.3 | 1.4 | 1.4 |
| Composition 3 | 10.0 | 7.5 | 5.0 | 2.5 | 0 | 0 |
| Total weight % of Composition 5 | 0 | 10.5 | 21.0 | 31.3 | 41.5 | 47 |
| Total Parts by Weight of Composition 5 | 0 | 11.8 | 26.6 | 45.6 | 71 | 90 |

*Composition 1 was replaced by another similar composition having a formulation that would increase the quantity of Composition 5 without increasing the quantity of Composition 4 therein. The formula was 50 parts of Composition 4, 50 parts of Composition 5, 1.56 parts of a low molecular weight cyclic siloxane containing MeViSiO units and having a viscosity of 1 to 2 cs. at 25° C., 0.96 parts of $RhCl_3 \cdot (n\text{-}Bu_2S)_3$ catalyst at 3.15 weight percent in toluene.

| Type of Adhesive | TEST RESULTS Experimental Sample Release Force, Grams | | | | | |
|---|---|---|---|---|---|---|
| | A | B | C | D | E | F |
| 1 | 23 | 32 | 40 | 60 | 85 | 250–275 |
| 2 | 19 | 29 | 38 | 60 | 80 | + |
| 3 | 43 | 55 | 80 | 140 | * | 250–300 |
| 4 | 38 | 45 | 65 | 90 | 150–200 | + |

* Sample Tore
+ Not Taken

These examples had high gloss, were clear and colorless and exhibited no rub-off. It should be noted that this inventive composition has enough versatility to be used on four separate adhesive materials.

For comparison purposes, a coating material, as was prepared above, was used except the catalyst was platinum instead of rhodium. The platinum was used in two different forms, one was chloroplatinic acid and the other was a complexed platinum. The amount of platinum in each case was 42 ppm which was equivalent to the amount of rhodium used in the material above.

| Parts by Weight Material | Sample Number | | |
|---|---|---|---|
| | 1 | 2 | 3 |
| Composition 4 | 13.75 | 13.75 | 13.75 |
| Composition 5 | 11.25 | 11.25 | 11.25 |
| Crosslinker+ | 1.45 | 1.45 | 1.45 |
| $H_2PtCl_6 \cdot 6H_2O$/IPA | | 0.28 | |
| Complexed Platinum | | | 0.19 |
| Rhodium | 0.20 | | |

+trimethylsiloxy-endblocked polymethylhydrogen siloxane having approximately 30 methylhydrogen units.

| Results: | Sample Number | | | | | | | | |
|---|---|---|---|---|---|---|---|---|---|
| | 1 | | | 2 | | | 3 | | |
| Cure | Smear | Ruboff | Migration | Smear | Ruboff | Migration | Smear | Ruboff | Migration |
| 45"/325° F. (163° C.) | — | — | — | — | — | — | — | — | — |
| 30"/325° F. | None | None | None | — | — | — | — | — | — |

-continued

Results:

| Cure | Sample Number 1 | | | Sample Number 2 | | | Sample Number 3 | | |
|---|---|---|---|---|---|---|---|---|---|
| | Smear | Ruboff | Migration | Smear | Ruboff | Migration | Smear | Ruboff | Migration |
| (163° C.) 45"/300° F. | None | None | None | — | — | — | — | — | — |
| (149° C.) 30"/300° F. | None | None | Slight | None | None | None | None | None | None |
| (149° C.) 30"/275° F. (135° C.) | — | — | — | None | None | Slight | None | None | Slight |

The above materials were subjected to a bathlife test in the following manner:

| Parts by Weight | Sample Number | | |
|---|---|---|---|
| Materials | 4 | 5 | 6 |
| Composition 4 | 27.50 | 27.50 | 27.50 |
| Composition 5 | 22.50 | 22.50 | 22.50 |
| Crosslinker | 2.90 | 2.90 | 2.90 |
| $H_2PtCl_6 \cdot 6H_2O$ | | 0.56 | |
| Complexed Platinum | | | 0.38 |
| Rhodium | 0.40 | | |

Bath life:

| Sample No. | cps. at 25° C. | | | |
|---|---|---|---|---|
| | Initial Visc. | 1 hour | 5 hours | 22 hours |
| 4 | 1620 | 1810 | 1920 | 2930 |
| 5 | 10,800 | gelled | gelled | gelled |
| 6 | 10,000 | gelled | gelled | gelled |

CONCLUSION:

The bath stability of rhodium catalyzed materials is much better than platinum catalyzed materials.

That which is claimed is:

1. A composition comprising
   (1) 100 parts by weight of a diorganopolysiloxane-based formulation which is heat curable to an elastomer by the addition of methylhydrogenpolysiloxanes to silicon-bonded alkenyl groups,
   (2) from 0.5 to 90 parts by weight of a toluene soluble copolymer of (a) $R_3SiO_{1/2}$ units, (b) $(CH_2=CH)R_2SiO_{1/2}$ units and (c) $SiO_{4/2}$ units, the ratio of said (a) and (b) units to (c) units being from 0.6:1 to 1.1:1 and the silicon bonded hydroxy content of (2) being no more than 0.7 weight percent based on the weight of (2), where R is a monovalent hydrocarbon radical of no more than 2 carbon atoms, and
   (3) a catalyst comprising complexes of rhodium selected from the group consisting of (i) $RhX_3(SR'_2)_3$ and (ii) $Rh_2(CO)_4X_2$, wherein each X represents a halogen atom and each R' represents an alkyl, aryl, aralkyl or alkaryl radical having from 1 to 8 inclusive carbon atoms or the $R''_3SiQ$- group in which Q represents a divalent aliphatic hydrocarbon radical having from 1 to 6 inclusive carbon atoms and R'' represents an alkyl, aryl, aralkyl or alkaryl radical having from 1 to 8 inclusive carbon atoms or a $(CH_3)_3Si$- group, not more than one R'' per molecule being $(CH_3)_3Si$-, the entire composition being essentially free of solvents.

2. A composition as claimed in claim 1 wherein (3) is $RhCl_3(Bu_2S)_3$.

3. A composition as claimed in claim 1 wherein the polydiorganosiloxane (1) is a copolymer comprising methylvinylsiloxane units, dimethylsiloxane units, any endblocking units present being selected from trimethylsiloxy units and dimethylvinylsiloxane units and which is cured using a trimethylsiloxy endblocked methylhydrogenpolysiloxane.

4. A substrate when coated with the composition of claim 1.

* * * * *

UNITED STATES PATENT AND TRADEMARK OFFICE
CERTIFICATE OF CORRECTION

PATENT NO. : 4,123,604

DATED : October 31, 1978

INVENTOR(S) : Robert W. Sandford, Jr.

It is certified that error appears in the above-identified patent and that said Letters Patent are hereby corrected as shown below:

In Column 1, line 59; the word reading "the" should read "that".

In Column 5, line 13; the word reading "groups" should read "group".

In Column 5, line 25; the word reading "is" should read "in".

In Column 6, line 33; the line reading "It is believed, and the inventor does not wish to held" should read "It is believed, and the inventor does not wish to be held".

Signed and Sealed this

Thirteenth Day of October 1981

[SEAL]

*Attest:*

GERALD J. MOSSINGHOFF

*Attesting Officer*   *Commissioner of Patents and Trademarks*